(12) United States Patent
Melni et al.

(10) Patent No.: US 12,308,589 B2
(45) Date of Patent: May 20, 2025

(54) CONNECTORS AND METHODS UTILIZING WIRE/LINE WRAPPING

(71) Applicant: MELNI, LLC, Twin Falls, ID (US)

(72) Inventors: Mark L. Melni, Twin Falls, ID (US); Cameron Troy Williams, Twin Falls, ID (US)

(*) Notice: Subject to any disclaimer, the term of this patent is extended or adjusted under 35 U.S.C. 154(b) by 468 days.

(21) Appl. No.: 17/569,475

(22) Filed: Jan. 5, 2022

(65) Prior Publication Data

US 2022/0255243 A1 Aug. 11, 2022

Related U.S. Application Data

(60) Provisional application No. 63/134,563, filed on Jan. 6, 2021.

(51) Int. Cl.
*H01R 4/14* (2006.01)
*F16L 19/00* (2006.01)
(Continued)

(52) U.S. Cl.
CPC ............ *H01R 4/14* (2013.01); *H01R 13/005* (2013.01); *H01R 13/622* (2013.01); *H01R 24/38* (2013.01); *F16L 19/00* (2013.01)

(58) Field of Classification Search
CPC ...... H01R 4/14; H01R 13/005; H01R 13/622; H01R 24/38; H01R 13/187; H01B 17/265;
(Continued)

(56) References Cited

U.S. PATENT DOCUMENTS 5,655,269 A * 8/1997 Sagalovich ............... F16B 2/06
188/65.1
7,500,642 B2 * 3/2009 Cunningham ........ F16L 55/035
248/65
(Continued)

FOREIGN PATENT DOCUMENTS

EP 1997191 B1 3/2008
FR 2892569 A1 4/2007

OTHER PUBLICATIONS

Internet image search of hyperbolic connector, https://www.bing.com/images/search?q=hyperbolic+connector, Dec. 7, 2020.
(Continued)

*Primary Examiner* — Renee S Luebke
*Assistant Examiner* — Paul D Baillargeon
(74) *Attorney, Agent, or Firm* — Pedersen and Company, PLLC; Ken J. Pedersen; Barbara S. Pedersen

(57) ABSTRACT

A connector, and associated methods, connect conductors or conduits by twisting/wrapping multiple lines around the conductors/conduits after they are inserted into the connector. Flexible/bendable lines extend between relatively rotatable housing portions and through the interior of the connector, parallel to but distanced from the longitudinal axis of the connector. After inserting the conductors/conduits into the connector at/near the longitudinal axis, between the lines, the housing portions are rotated relative to each other, automatically twisting/wrapping the lines around the outer surfaces of the conductors/conduits. This way, the conductors are secured together in electrical contact, or the conduits are secured and fluid-sealed to a hollow tubular insert on which the conduits ends are placed and which connects the interior fluid passageways of the conduits.

24 Claims, 8 Drawing Sheets

(51) Int. Cl.
*H01R 13/00* (2006.01)
*H01R 13/622* (2006.01)
*H01R 24/38* (2011.01)

(58) Field of Classification Search
CPC ....... F16L 37/24; F16L 37/242; F16L 37/244; F16L 33/223; F16L 19/00
USPC .................. 174/24 JS, 21 JR, 21 JC, 21 JCA
See application file for complete search history.

(56) References Cited

U.S. PATENT DOCUMENTS

| | | | |
|---|---|---|---|
| 7,696,854 B2 | 4/2010 | Rittstieg et al. | |
| 7,794,255 B2 | 9/2010 | Melni | |
| 7,901,233 B2 | 3/2011 | Melni | |
| 8,066,525 B2 | 11/2011 | Melni | |
| 8,246,370 B2 | 8/2012 | Melni | |
| 8,771,000 B2 | 7/2014 | Melni | |
| 9,484,641 B2 * | 11/2016 | Ohkubo | H01R 13/187 |
| 9,608,346 B2 | 3/2017 | Melni | |
| 9,614,304 B2 | 4/2017 | Melni | |
| 10,109,929 B2 * | 10/2018 | Zukowski | H01R 4/12 |
| 11,177,600 B2 * | 11/2021 | Wang | H01R 4/5008 |
| 11,306,855 B2 | 4/2022 | Melni | |
| 2023/0049943 A1 * | 2/2023 | Melni | H01R 4/70 |

OTHER PUBLICATIONS

IntegraMate® Hyperboloid Contact Systems, QA Technology Company, Inc, http://www.qatech.com/en/products/integramate/hyperboloid-contact-systems.html, Dec. 7, 2020.

Specsheet for IEH Hyperboloid Connectors and the company's Our Technology page, www.iehcorp.com, At least as early as Dec. 31, 2020.

Radsok® R8S, Amphenol, www.amphenol-sine.com, and https://amphenol-automotive.de/wp-content/uploads/2018/09/C390-14mm-Radsok-R8S.pdf, At least as early as Dec. 31, 2020.

* cited by examiner

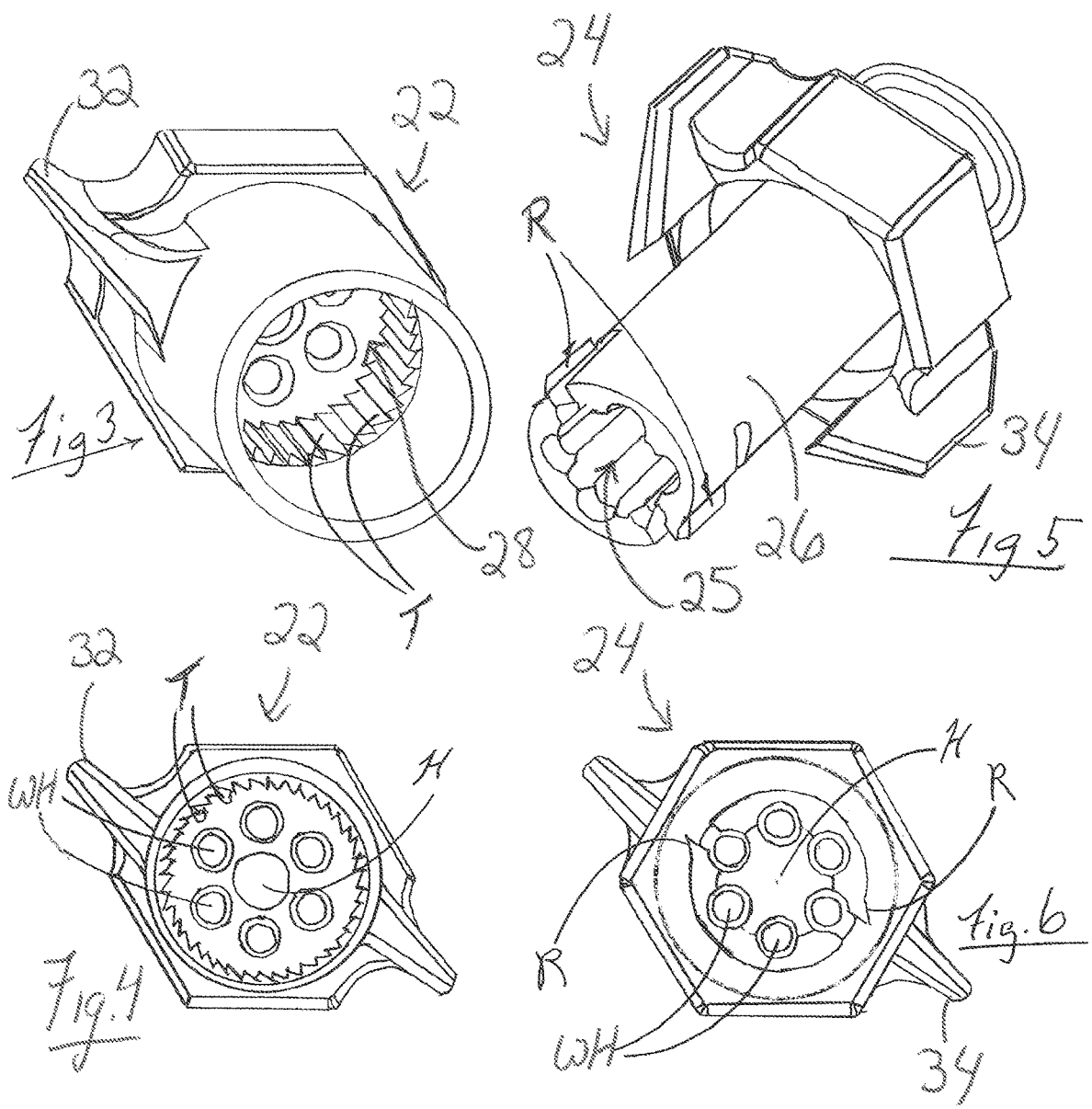

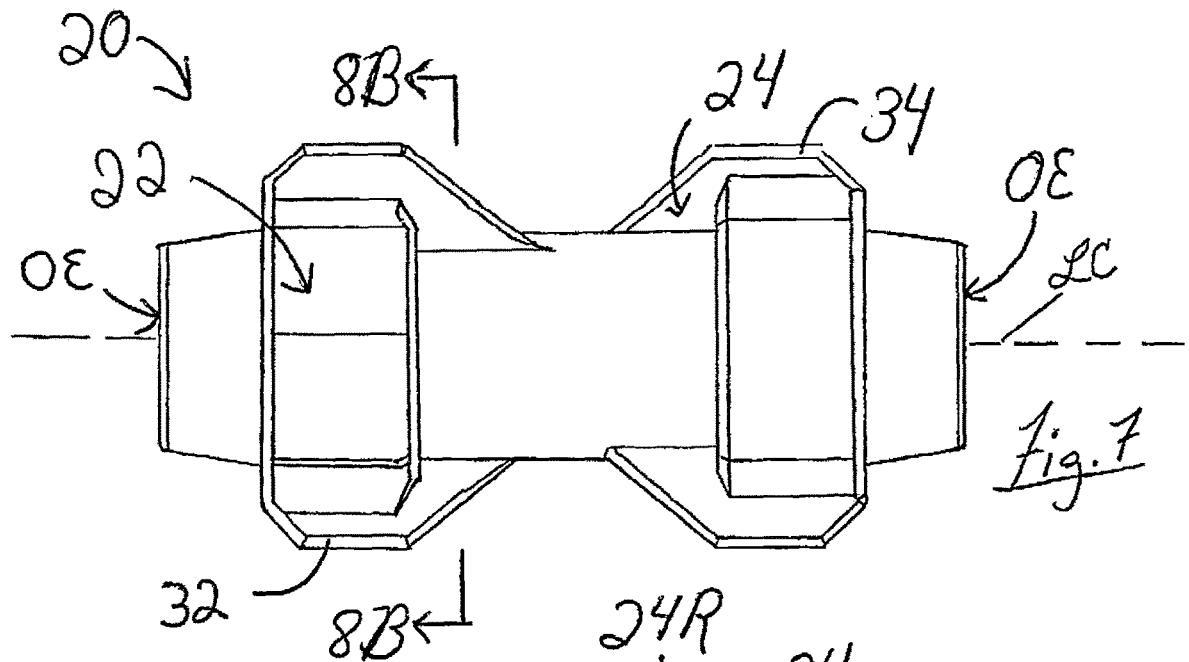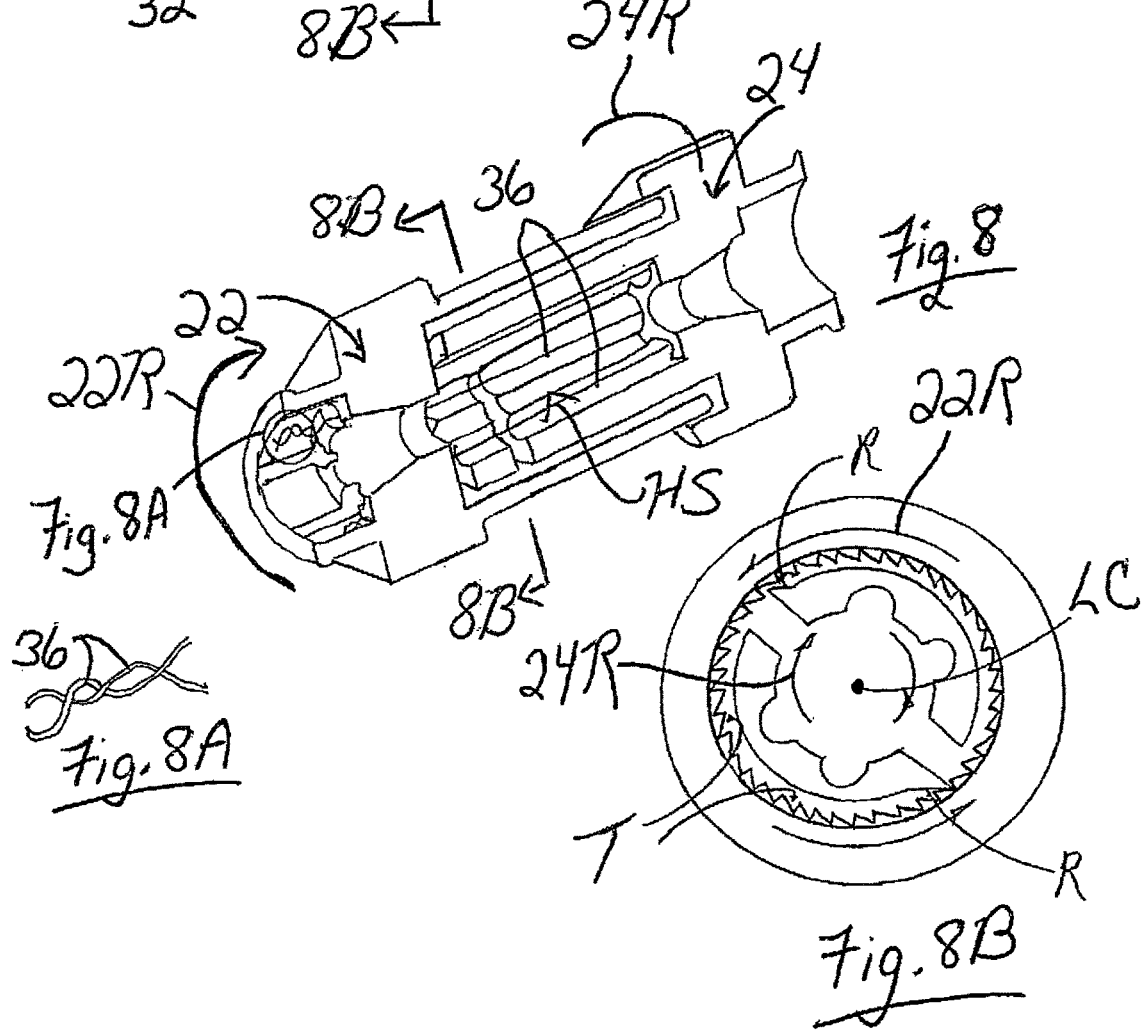

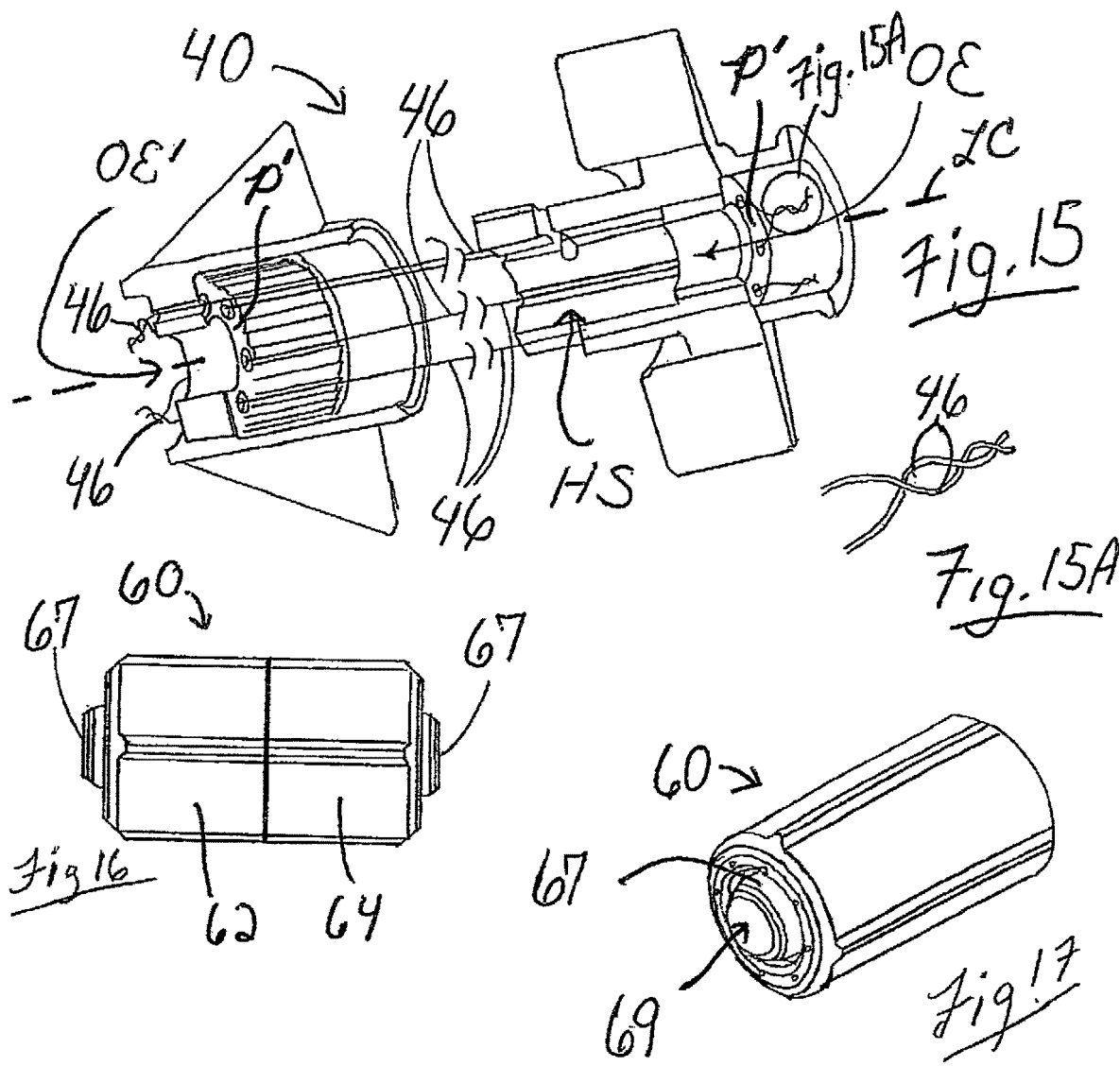

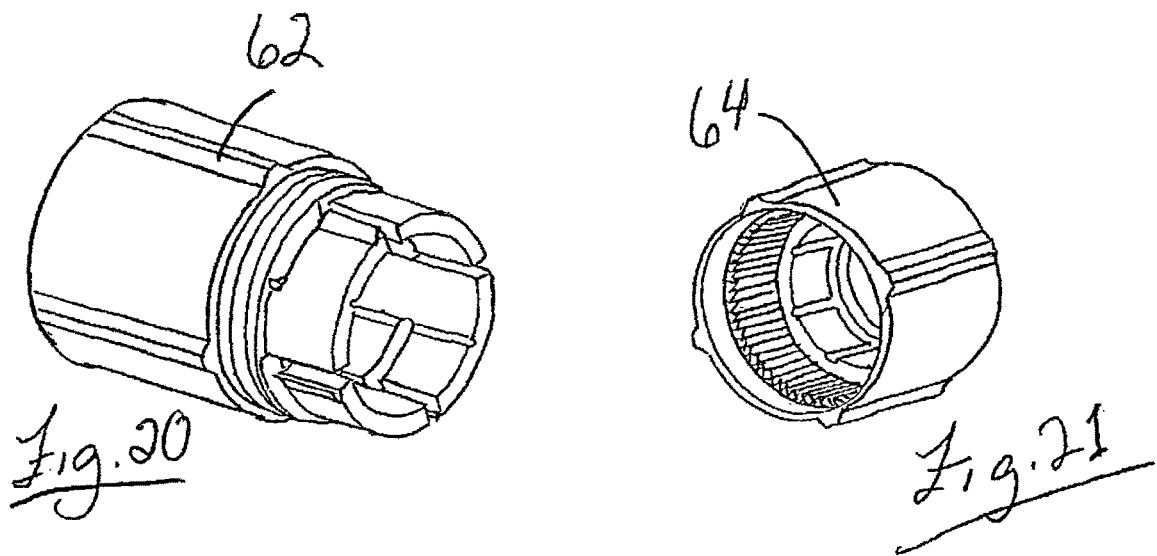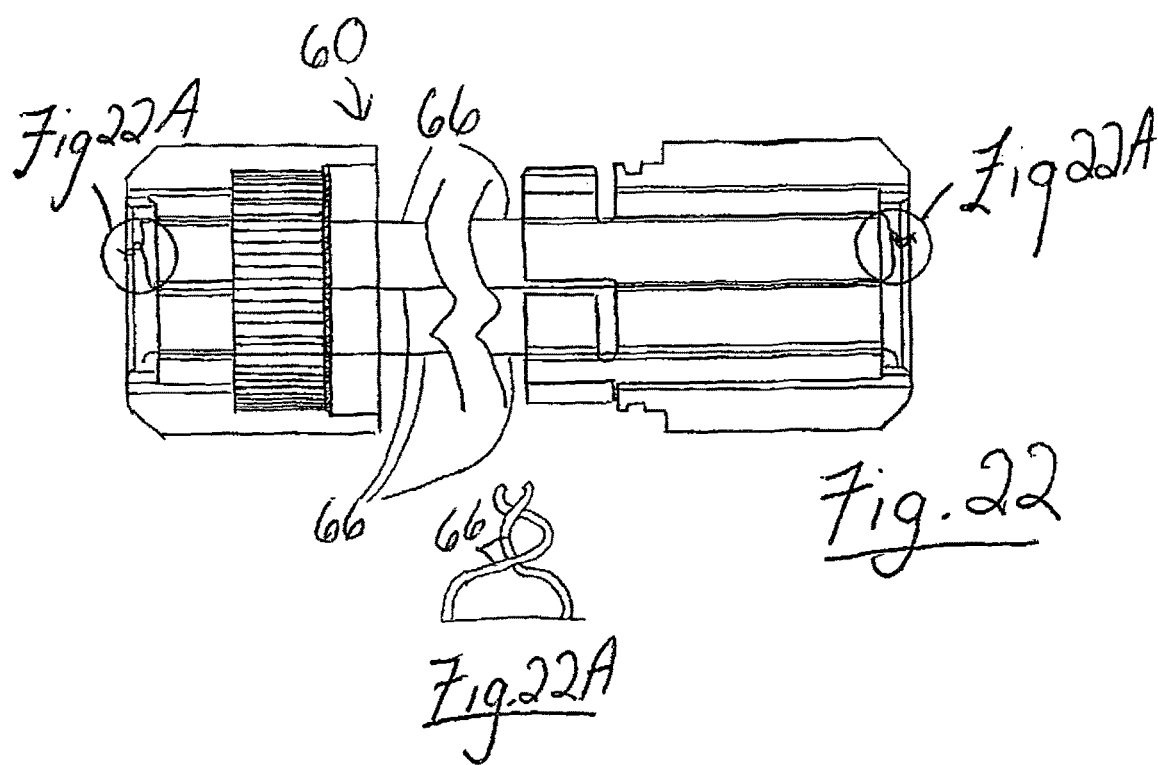

CONNECTORS AND METHODS UTILIZING WIRE/LINE WRAPPING

This application claims benefit of Provisional Application No. 63/134,563, filed Jan. 6, 2021, and entitled "CONNECTORS AND METHODS UTILIZING WIRE/LINE WRAPPING", which is incorporated herein in its entirety by this reference.

FIELD OF THE INVENTION

This invention related to apparatus and methods for connecting elongated elements together. Certain embodiments relate to mechanical connections, electrical connections, and/or fluid conduit connections.

SUMMARY

A connector and/or associated methods, are adapted for twisting/wrapping multiple elongated members around elements that are to be connected, after insertion of the elements into the connector. Twisting or rotating portions of the connector relative to each other may twist/wrap the elongated members tightly around the elements to bind them together or to an intermediate piece of the connector. The connector may be used for connecting various elongated elements, such as electrical conductors, fluid conduits, ropes, strings, cables, bars or other elongated objects, and the connection may comprise mechanical connection, electrical connection, and/or fluid connection.

In certain embodiments, the elongated members are elongated wires, lines, cables, ropes, straps, filaments, or strands (hereafter, called "wires" or "lines" for simplicity) which in certain embodiments may be metal or electrically conductive material, or in other embodiments may be non-electrically-conductive material. The elongated members are anchored at their opposing ends to opposing-end housing portions. In a relaxed condition of the connector and its wires/lines, the wires/lines are spaced apart and parallel or generally parallel to each another, extending between the opposing housing portions, longitudinally straight or substantially straight, through an interior space inside the connector. The relaxed wires/lines are spaced from the longitudinal central axis (or "longitudinal centerline") of the connector and of said interior space, preferably in a circular/cylindrical array of wires/lines. While the connector and wires/lines are in the relaxed condition, the elements-to-be-connected (hereafter, "elements") are inserted into one or both ends of the connector so that they extend along or close to the connector's longitudinal centerline, inside the array of wires/lines.

After insertion of the elements into the connector, the housing portions are then rotated relative to each other, on the longitudinal centerline of the connector, so that the ends of the wires/lines are also rotated relative to each other, in opposite directions. Because the wire/line ends are radially distanced from the longitudinal axis, the rotation of the opposite ends of the wires/line ends causes the wires/lines to cross over each other at/near the longitudinal centerline of the connector at or near the midpoint/midline of each wire/line. Given that the elements-to-be-connected are at or near the longitudinal centerline of the connector, the rotation of the wires/line ends wraps the wires/lines around the elements at or near said longitudinal centerline and said midline of the wires/lines. Thus, the wrapping of each wire/line begins at or near the center of the length of the wires/lines, which is typically about midway between the two opposing-end housing portions, and forms a wire/line shape that may be likened to a "hyperbolic curve". As the rotation of the housing portions continues, the wrapping continues and the compressive/radially-inward force of the wires/lines on and around the elements increases. This force pushes the elements together in tight contact with each other and/or in tight contact with a support insert, in what may be considered a tight bundle of elements wrapped with wire/line or a tight bundle of elements on/against a support insert and wrapped with wire/line.

In certain embodiments, that elements are inserted into the connector so that they overlap longitudinally. This is especially preferred in electrical connectors, to create or enhance the mechanical connection of the elements and to increase the electrical contact area between the bundled elements. Also in electrical connectors, the wires/lines may be electrically conductive to further enhance the electrical connection.

In other embodiments, the elements are inserted into the connector with little or no longitudinal overlap but are secured to an insert in the connector by the wrapping of the wires/lines. The insert may be a solid element-support in certain embodiments, or may be a hollow element-support in other embodiments. Hollow inserts are particularly beneficial for fluid-connection of fluid conduits, by pushing the conduits over opposite ends of a hollow, open-ended insert. In such embodiments, the outer surface of the insert supports, and is sealed to the inside surface of, each of the two fluid conduits. The wires/lines force/compress the fluid conduits against their respective ends of the insert, to create or enhance the mechanical connection and the fluid-sealing of the conduits to the insert, creating a bundle of conduit ends plus insert. This way, the insert serves as a preferably rigid, solid-wall tube that extends inside and between the fluid passageways of the two fluid conduits, keeping the fluid conduits open, and connecting the internal fluid passageways of the conduits in non-leaking fluid communication.

BRIEF DESCRIPTION OF THE DRAWINGS

FIG. 3 is an inner end perspective view of an embodiment of a first housing portion that may be used in certain embodiments of the invented connector.

FIG. 4 is an inner end view of the first housing portion of FIG. 3.

FIG. 5 is an inner end perspective view of an embodiment of a second housing portion that may be used in cooperation with the first housing portion of FIG. 3.

FIG. 6 is an inner end view of the second housing portion of FIG. 5.

FIG. 7 is a side view of a connector assembled from the first and second housing portions of FIGS. 3-6.

FIG. 8 is a longitudinal cross-sectional view of the connector of FIG. 7.

FIG. 8A shows a detail of the wires or other elongated members tied to the first housing portion of the connector of FIG. 8.

FIG. 8B shows a radial cross-section of the connector of FIG. 8, viewed along the line 8B-8B in FIGS. 7 and 8, illustrating the ratchet system for latching the connector in a tightened condition.

FIG. 15 is a longitudinal cross-section of the connector of FIGS. 12-14, with the closed-end cap removed, showing how wires or other elongated members extend through the connector and are tied to the two housing portions.

FIG. 15A is a detail of wires being tied to the open-end of the connector of FIG. 15.

FIG. 16 is a side view of an alternative connector according to another embodiment of the invention, which includes an embodiment of a hollow insert adapted for receiving and connecting elements that are two fluid conduits with one fluid conduit on each of the two ends of the insert.

FIG. 17 is a perspective end view of the connector of FIG. 16.

FIG. 20 is an inner end perspective view of a first housing portion of the connector of FIG. 16 with the insert removed.

FIG. 21 is an inner end perspective view of a second housing portion of the connector of FIG. 16 with the insert removed.

FIG. 22 is a longitudinal cross-section of the connector of FIG. 16, wherein the first and second housing portions are operatively connected, but with the insert removed.

FIG. 22A is a detail illustrating wires or other elongated elements tied to each of the first and second housing portions of the connector of FIG. 22.

DETAILED DESCRIPTION OF CERTAIN EMBODIMENTS

Figure 1:
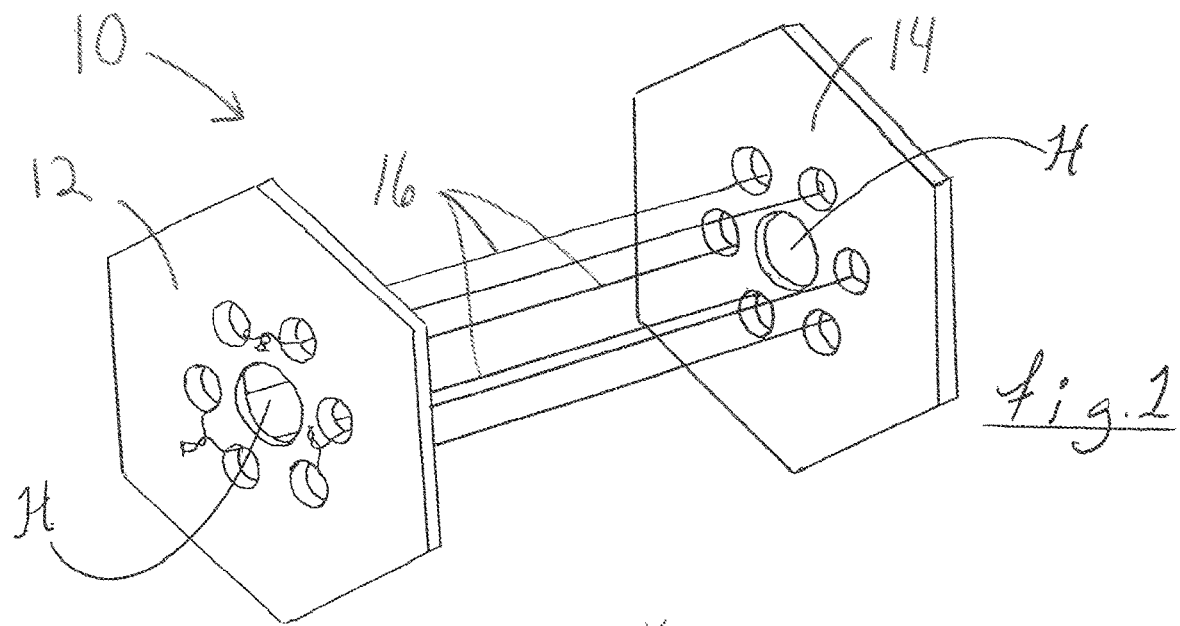
FIG. 1 is a schematic side perspective view of one embodiment of the invented connector comprising two end plates and wires extending between the end plates in a relaxed configuration/condition of the connector.

Referring to the Figures, there are shown schematic drawings illustrating certain broad concepts used in the preferred embodiments, and multiple, but not the only, embodiments of the invention. The connectors and methods of the invention may be used for mechanical connection, plus electrical connection in certain embodiments or plus fluid connection in certain embodiments. The preferred embodiments may comprise, consist essentially of, or consist of, a housing, elongated elements inserted into the housing, and elongated members attached/secured to the housing that are twisted/wrapped around the elements by adjusting/moving one or more portions of the housing.

In embodiments used to connect electrical conductors, or other non-fluid-conduit elements, the elements are typically inserted into the connector so that their ends lie side-by-side near or against each other, and the housing is adjusted/moved to twist/wrap the elongated members (also "wires" or "lines") around the elements to bind them together, for example, in what may be described as a "bundle". Alternatively, the connector for electrical or other non-fluid-conduit elements may be provided with an insert that is adapted to support or stabilize the elements when the members are twisted/wrapped around the elements; this way, the "bundle" of elements bound together by the elongated members also features an internal insert forming a support core for the elements. Such a support core may be electrically conductive in some embodiments.

If fluid conduits are being connected, the internal fluid-passageways of the conduits are place in sealed, fluid-communication with each other. This is preferably done by providing the connector with a hollow, open-ended insert in the interior space of the connector as both a support and sealing member. As part of installation of the two conduit ends in the connector, the open ends of the conduits are slid over the opposing ends of the insert, so that the two conduits are coaxial with the insert. Then, the elongated members are twisted/wrapped around the outer surfaces of the conduit ends to apply compressive/radially-inward force to push the conduits against the outer surface of the insert, creating a secure and fluid-sealed connection of each conduit with the insert and therefore connected and sealed for fluid communication between the conduits' interior fluid-passageways via the hollow inner passageway of the insert.

The elongated members, such as elongated wires/lines, may be of various materials depending on the use, for example, they may be electrically conductive, flexible/bendable and of durable material(s) for many connector embodiments that connect electrically-conductive elements. For connector embodiments that connect fluid-conduits, the elongated members may be a variety of members selected from non-electrically-conductive to electrically conductive, and made of flexible/bendable and durable material(s), for example, stainless steel, brass, nylon, or other materials. In certain fluid-conduit connectors, it may be preferred to have non-electrically-conductive members, but electrically conductive members may have benefits in some fluid-connection cases, for example, for member strength or durability. It is preferred that the elongated members are not elastic or stretchable, as the preferred connector relies on large forces being exerted by the elongated members as they are wrapped around the elements being connected, and, in many embodiments, elastic stretching would reduce the force to an ineffective amount.

The housing may include two portions that are coaxial or generally coaxial, and adapted for relative rotation, for example, one in clockwise direction in an end view while the other is held still or the other is rotated counter-clockwise in the same end view, or one in counter-clockwise direction in an end view while the other is held still or the other is rotated clockwise in the same end view. The housing portions preferably include a latching/locking mechanism that prevents relative rotation of the two portions in reverse directions that would loosen the wires/lines. In certain embodiments, the latching/locking mechanism is a ratchet system, which allows relative rotation in one direction but not the other, and the design of the ratchet system will determine which direction that is. Thus, the rotation will wrap/tighten the wires/lines around the inserted elements (electrical conductors or fluid conduits, for example) but, upon the user letting go of the housing portions, the housings will latch/lock and will not reverse direction and will not loosen the wires/lines. Some, but not all, embodiments of housings that rotate relative to each other and can latch/lock are shown in the Inventor(s)' previous patents, for example, U.S. Pat. Nos. 9,614,304, 9,608,346, 8,246,370, 7,901,233, and 7,794,255 and their related applications and priority applications, all incorporated herein by this reference. After studying this disclosure including the attached drawings, one of average skill may see how to adapt/modify certain of the housings of these prior patents and applications to work in combination with this disclosed technology. Alternatively, after studying this disclosure including the attached drawings, one of average skill may see alternative ways of adapting housing portions to rotate relative to each other and to be locked after a desired amount of rotation, for example, by a pin, peg, exterior latch, or other fastener.

The connector housing in certain embodiments is hollow and at least partially-open-ended at both ends, which allows elements to be inserted from opposite directions into the connector, and for the elements to overlap inside the connector for being wrapped together and connected together by the wires/lines. Or, in other embodiments, the connector housing is hollow and at least partially open at only one end, which allows elements to be inserted from one direction/end into the connector, and for the elements to be side-by-side inside the connector for being wrapped together and connected together by the wires/lines.

The wires/lines may be installed in the housing portions by the opposite ends of each wire/line being tied to or otherwise secured/fixed to opposite housing portions. When the connector is in the relaxed/released condition, the wires/lines are typically also relaxed, and are each straight or substantially straight, extending through the connector at locations that are radially spaced from the longitudinal centerline of the connector, and not typically touching. In fluid-conduit connector embodiments, the wires/lines in the relaxed condition are also each straight, extending through the connector at locations that are radially spaced from the longitudinal centerline of the connector, not typically touching, and also radially-spaced from, and typically not touching, the insert.

One may understand from this disclosure and from the drawings, that the preferred structure and methods use elongated members ("wires/lines") that are non-coiled and non-wrapped in their relaxed condition, for example, after manufacture of the connector and at the beginning of the connection method. Instead of being installed into the connector housing as a coiled, spiral unit, the wires/lines are straight or substantially straight and parallel to each other, extending between the two housing portions. The wires/lines are preferably "off-the-shelf" elongated members, for example, off-the-shelf wires, lines, cables, ropes, straps, filaments, or strands. For example, there may be 2-20 wires/lines, with preferred embodiments containing 4-12 wires/lines, 6-10, or 6-8 wires/lines. The wires/lines may each be cylindrical (circular in cross-section), but may also be other shapes in certain embodiments, such as square or rectangular in cross-section. One may see that each wire/line, as it is twisted/wrapped around the conductors/conduits (or other elements), takes a hyperbolic-curve shape in side-view, with the center region of the wire/line being at/close to the outer surface of the conductors/conduits, and the ends of the wire/line being radially spaced from the conductors/conduits. One may understand from the drawings that, as the rotation and resulting twisting/wrapping continues, more and more of the wire(s)/line(s) is at/close to and/or wrapped round the conductors/conduits. Thus, during the tightening of the connector, the wires/lines leave their straight, longitudinal orientations and generally take a hyperbolic curve/spiral shape. For secure connection and contact and/or sealing of the conductors/conduits, the rotation of the housing portions and their respective wire-ends preferably twists/wraps the wires/lines entirely around the conductors/conduits at least two times, that is, at least 720 degrees, but more preferably, the wires/lines extend around the conductors/conduits more than 2 times, for example, 3-6 times, that is, 1080 degrees-2160 degrees, or 3-4 times, that is 1080-1440 degrees. The number of rotations/wraps/twists and consequent amount of tightening may be specified in advance for a particular connector and/or use, or, in certain embodiments, the amount of tightening will be determined by the resistance felt by the person tightening the connector.

The preferred wires/lines are differentiated from the spiral(s) of the Inventor(s)' prior patents, for example, U.S. Pat. Nos. 9,614,304, 9,608,346, 8,246,370, 7,901,233, and 7,794,255 in which a spiral unit is pre-formed and installed in the connector housing prior to use of the connector and prior to insertion of elements-to-be-connected into the connector. The preferred wires/lines of the present disclosure, on the other hand, may be called "non-pre-coiled", "non-pre-spiraled" and "non-pre-wrapped". Each wire/line is installed in the connector as a straight or substantially straight member and remains that way, until moved from the straight relaxed condition, during use of the connector, by said twisting/wrapping that is done after insertion of the elements-to-be-connected into the connector. The term "substantially-straight" herein means within 20 degrees, and more preferably within 10 degrees, of straight, for example, 20 degrees or less, or more preferably 10 degrees or less, from parallel to the longitudinal centerline of the connector and of the interior space.

Prior art U.S. Pat. No. 7,696,854, relating to the commercial product RADSOK™ connectors, describes a device that has been called a "hyperbolic" connector. However, this device is quite different from the present disclosed technology. U.S. Pat. No. 7,696,854 states "fastening and fuse element 6 may be sleeve-shaped and may have a generally hyperbola shape, i.e., a fitted waisted shape. The sleeve-shaped fastening and fuse element 6 may be made as a bar grid with several clamping members or bars 7a, 7b and 7c spaced apart in the peripheral direction. The electrically conductive bars 7a, 7b and 7c (FIG. 3) extend longitudinally between two peripheral rings 8 and 9. The rings 8 and 9 are radially supported on the inside of the housing 5. The rings 8 and 9 are preferably made of metal and integrally with the bars 7a, 7b and 7c wires/lines formed in a non-continuous, open-ended sleeve into which conductors are inserted." During the insertion of the conductors, the "radially-resilient" clamping bars 7a, 7b and 7c of the sleeve may flex slightly at the "waist" of the hyperboloid sleeve, to receive the conductors and to hold the conductors in view of the conductors being slightly larger in outer diameter than the inner diameter of the sleeve. Therefore, the clamping members/bars 7a, 7b and 7c resiliently holding/gripping the conductors, but do not wrap around the conductors. The ends of the connector and the associated ends of the sleeve do not move relative to each other, and these sleeve-based connectors do not operate by twisting/wrapping wires/lines around inserted conductors. Instead, conductors just slide into the sleeve that remains substantially the same shape and same orientation as when manufactured and before insertion of the conductors. The only movement of the sleeve is the curved camping bars 7a, 7b, 7c flexing slightly at the smallest diameter of the sleeve/bars to allow insertion and frictional holding of the conductors by that smallest diameter region, that is, the "waist" of the sleeve. The website iehcorp.com shows similar "hyperboloid connectors" that include such sleeves, and that are also very different from the present disclosed technology.

Figure 2:
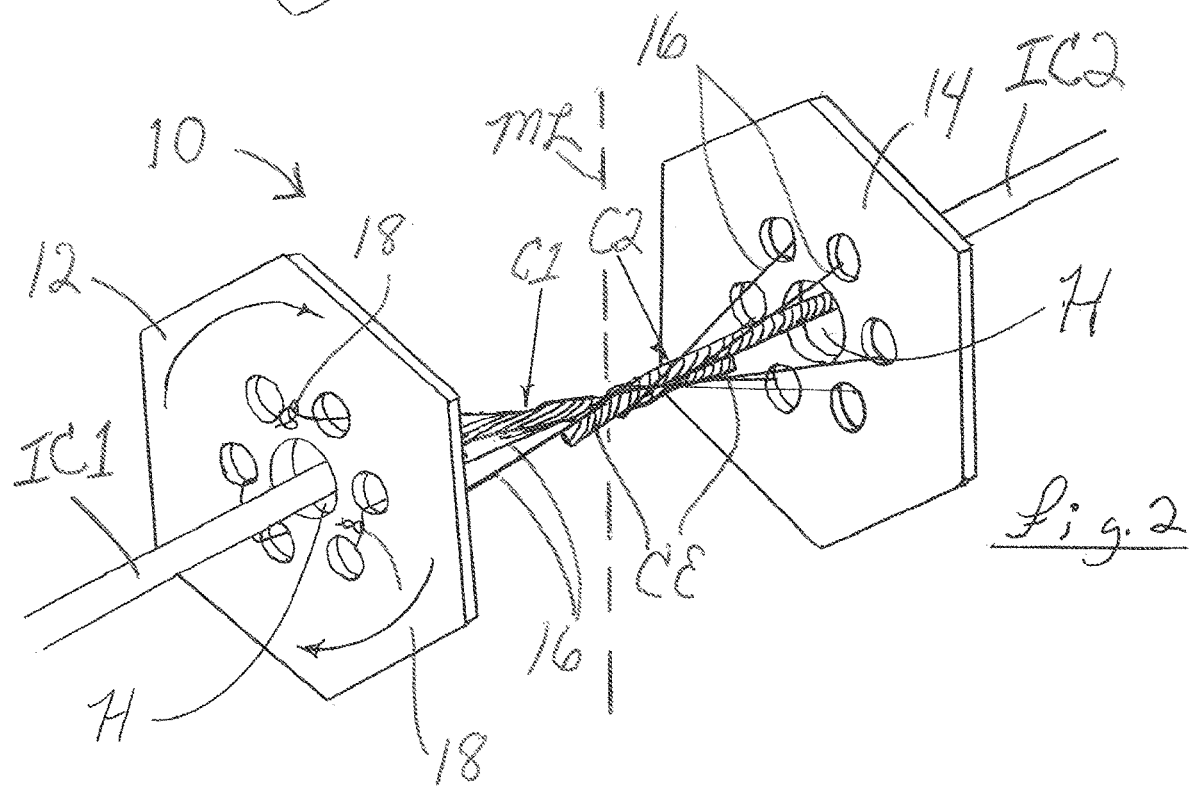
FIG. 2 is a schematic side perspective view of the embodiment of FIG. 1, with two elements inserted into the connector and showing a method of actuating the connector to wrap the wires around the overlapping ends of the elements to place the connector in a tightened condition.

Referring Specifically to the Figures:

FIGS. 1 and 2 are schematic drawings of a connector 10 and method according to certain embodiments of the disclosed technology. FIGS. 1 and 2 show two parallel end plates 12, 14 that may be considered two portions of a wrapping-actuation system, for example two connector housing plates that actuate tightening of the connector 10 on elements-to-be-connected. Actuation is accomplished by relative rotation of the two housing plates 12, 14, so that elongated members 16 (wires, lines, cables, ropes, straps, filaments, or strands, for example) twist/wrap around the elements-to-be-connected to encircle said elements. As shown schematically by the twisted ends 18 of the members 16, the members 16 are secured/fixed to the housing plates and remain in that secured/fixed-attachment condition throughout use of the connector.

In the case of FIGS. 1 and 2, the elements-to-be-connected are electrical conductors C1, C2, wherein the inner ends CE of the conductors C1, C2 each extend past the midline ML that is halfway between the housing plates, so that the conductors C1, C2 overlap each other (FIG. 2). The midline ML also indicates the location of a mid-plane that is halfway between the plates, extends through the midline ML, and is parallel to the parallel housing plates. Actuation results in wrapping of the members 16 around the overlapping ends of the conductors C1, C2, creating a bundle of the ends CE of the conductors C1, C2 wrapped by members 16. Thus, the conductors C1, C2 are captured in the connector and electrically connected, and, if the members 16 are also electrically conductive, the members 16 tight contact with the conductors C1, C2 may enhance the electrical connection of the conductors C1, C2.

In FIG. 1, the parallel end plates 12, 14 are positioned so that the members 16 extend straight and parallel between the end plates 12, 14; this may be called the relaxed or disconnected condition/configuration. In FIG. 2, conductors C1, C2, such as the insulation-stripped ends CE of insulated wires or cables IC1, IC2 have been inserted into the connector 10, through holes H in the end plates 12, 14, and the end plates, and hence the outer ends of the member 16 at the end plates 12, 14, are being rotated relative to each other. As a result of this relative rotation, the member 16 are wrapping around the conductors C1, C2; this may be called the tightened or connected condition/configuration.

The end plates 12, 14 schematically portrayed in FIGS. 1 and 2 are preferably portions of a housing or other actuation system that is adapted so that the end plates/housing-portions do not move longitudinally toward each other during the rotation. This way, continued rotation and wrapping of the wires/lines around the conductors progressively tightens the members 16 around the conductors C1, C2, thus, increasing force/pressure/compression on the conductors, to affect a strong securement of the conductors C1, C2 inside the connector and a very tight connection of the conductors to each other and to the members 16. See, for example, the progressive wrapping/tightening of members show in FIGS. 9, 10, and 11. The conductors C1, C2 cannot, or are very unlikely to, slide out or be pulled out of the connector 10, and a strong, durable electrical connection is made between the two conductors.

FIGS. 3-8 show a connector 20 (assembled in FIGS. 7 and 8) comprising a first housing portion 22 (FIGS. 3 and 4) and a second housing portions 24 (FIGS. 5 and 6) that are operatively and rotatably connected to each other, for example, by the housing being made as a unit with relatively-rotating portions, or by separately-made portions snapping-together or otherwise being fastened together to allow relative rotation but to prevent any significant longitudinal-movement apart or together during use.

Elongated members such as wires 36 are fixed at their outer ends to the housing portions 22, 24 so that the wires 36 extend through the interior space HS (FIG. 8) of the connector 20 that may be described as being formed mainly/generally by the interior passage 25 of the tubular end 26 of housing portion 24, and in certain embodiments portions of the tubular inner space 28 of housing portion 22 that communicates with passage 25. Connector 20 may be used for an operation such as that in schematic FIGS. 1 and 2, wherein the rotation may be done manually by grasping the two housing portions 22, 24 in different hands for relative rotation, and/or by using tools to grasp and rotate the portions 22, 24, for example. The amount of tightening may be specified in advance for a particular connector and/or use, or, in certain embodiments, the amount of tightening will be determined by the resistance felt by the person tightening the connector. The first and second housing portions 22, 24 are assembled to be coaxial and to rotate relative to each other on the connector longitudinal axis of the connector 20 (also, longitudinal centerline LC) in a first relative direction, to actuate the connector. The connector further comprises a latch system that prevents the housing portions from rotating in a reverse direction opposite of the first relative direction, wherein an embodiment of the latch system may be a ratchet system of the first and second housing portions as described further below.

In FIGS. 4 and 6, one may see the larger holes H, at the center of the circular array of smaller holes WH ("wire holes"), wherein the outer open ends OE (FIG. 7) of each housing portion and the holes H receive elements-to-be-connected, such as electrically conductive cables/wires or other conductors (not shown in FIGS. 3-6). The circle of smaller holes WH are securement-locations for elongated members such as conductive wires (not shown in FIG. 3-6 but shown in FIGS. 8 and 8A as wires/lines 36). Alternatively, in connector 20 and other connectors portrayed in the drawings, other securement locations, and other securement methods, may be used instead of looping and/or tying the wires/lines through the smaller holes WH in the housing portions; in other words, other fasteners or anchoring means may be used to secure/fix the wires/lines to the housing portions.

Inside the two housing portions 22, 24 of connector 20, one may see the ratchet mechanisms that are an embodiment of a latch system that allows relative rotation of the two portions 22, 24 in one relative direction, but that latches the portions to prevent reverse rotation. Multiple ratchet teeth T are provided all around the interior surface of the first housing portion 22, and at least one and preferably multiple cooperating ratchet protrusions or "arms" R is provided on the outer surface of the second housing portion 24, in this embodiment at 180 degrees apart. With the first and second housing portions 22, 24 assembled so that the tubular end 26 of housing portion 24 is inserted into the tubular inner space 28 of housing portion 22, the housing portions 22, 24 are rotated relative to each other, as shown by opposite-direction arrows 22R and 24R respectively, and the protrusions R will move/slide along the teeth T. When the desired amount of rotation is completed, the protrusions R will engage/catch on the teeth and not be able to pass the teeth in an opposite direction, so that opposite-direction rotation is not possible, thus latching/locking the connector in the desired tightened condition. Such ratchet mechanisms may be understood further from the Inventor(s)' prior patents that are incorporated herein by reference.

Wings and/or other protrusions 32, 34 are provided on the outside of the housing portions, to assist a user in gripping the housings with his/her hands and/or tools to rotate the housing portions relative to each other. These protrusions may be helpful to accomplish further tightening when the force required to do so is great toward the end of the tightening process, when great forces resisting further tightening are exhibited because the wires/lines (shown in FIGS. 8 and 8A as 36) are already wrapped around the conductors several times, the wires/lines are preferably not elastic/stretchable to any significant extent, and the housing portions are adapted so that they do not move longitudinally closer together in spite of the tension on the tightening wires/lines 36.

FIG. 7 shows the housing portions of FIGS. 3-6 fully assembled to form the housing, with the outer end OE of the assembled housing being open ends. FIG. 8 shows a longitudinal cross-section of the assembled housing of FIG. 7, with wires/lines 36 installed. The wires 36 are looped through the small holes WH of, and/or otherwise secured/fixed to, their respective housing portions, and the wires 36 extend generally or entirely straight through the interior space of the housing. This condition of the connector, and the generally or entirely straight condition of the wires 36, may be called a relaxed, un-tightened, and/or "un-wrapped" condition.

FIG. 8A shows that the wires 36 may be installed in the housing portions by the wires 36 extending through and/or looping through the small holes WH that are arranged in a circle in the end of the housing portions 22, 24, and ends of the wires/lines being twisted to fix the ends to the housing portions. Other means may be used of securing/fixing the wires 36 to the housing portions in FIGS. 8 and 8A, such as pins, hooks, embedding or other durable connection/attachment means, and the various means will be understood to apply in the figures, for example, FIGS. 1, 2, 8 and 8A, 15 and 15A, and 22 and 22A. It will also be understood that the wires/lines will remain in that secured/fixed-attachment condition throughout use of the preferred connectors.

FIG. 8A shows a schematic transverse (radial) cross-section through the connector housing at the ratchet system, illustrating how rotation of the housing portions relative to each other is possible in one relative direction, for wrapping the wires 36 around an elongated elements (not shown in FIG. 8A or B) that reside in the connector at or near the longitudinal centerline LC. In FIG. 8B, the housing portion 22 of FIGS. 3 and 4 and its teeth T are rotating counterclockwise relative to the housing portion 24 of FIGS. 5 and 6 and its ratchet arms R. One may understand that continued rotation in the direction shown in FIG. 8B would continue to tighten the wires 36 around the elongated elements inside the connector and that reverse rotation of the two housing portions 22, 24 will not be allowed by the ratchet system, thus keeping the connector and wires 36 in the tightened condition.

Figure 9:
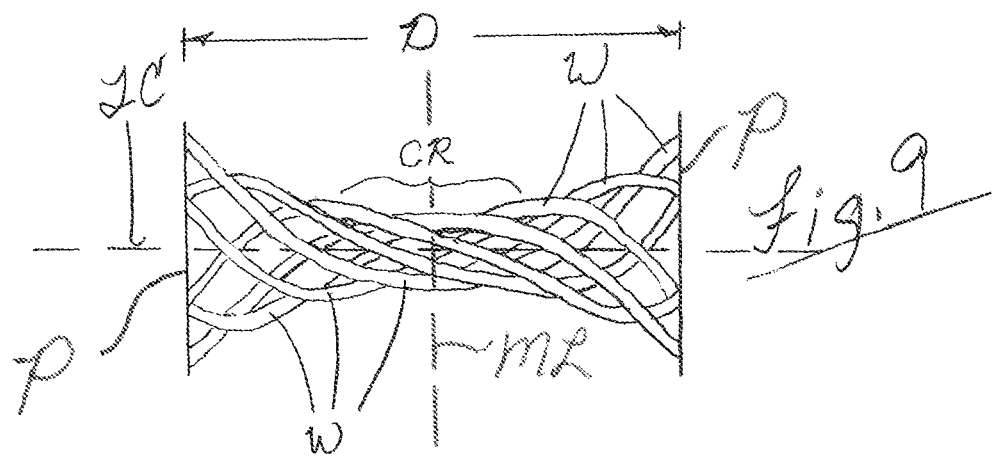
FIG. 9 is a side view schematically showing an embodiment of a method of the invention, such as may be used with the connector/housing portions of FIGS. 8, 8A and B, wherein actuation is beginning to twist/wrap wires or other elongated members.
Figure 10:
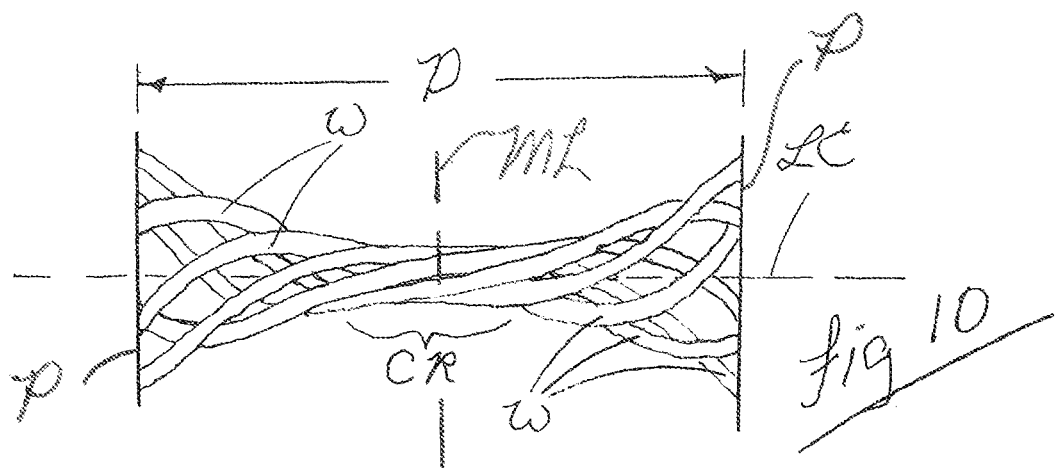
FIG. 10 is a schematic side view of the embodiment of FIG. 9, wherein twisting/wrapping has continued to start "bundling" of the wires at the center of the wires/connector.
Figure 11:
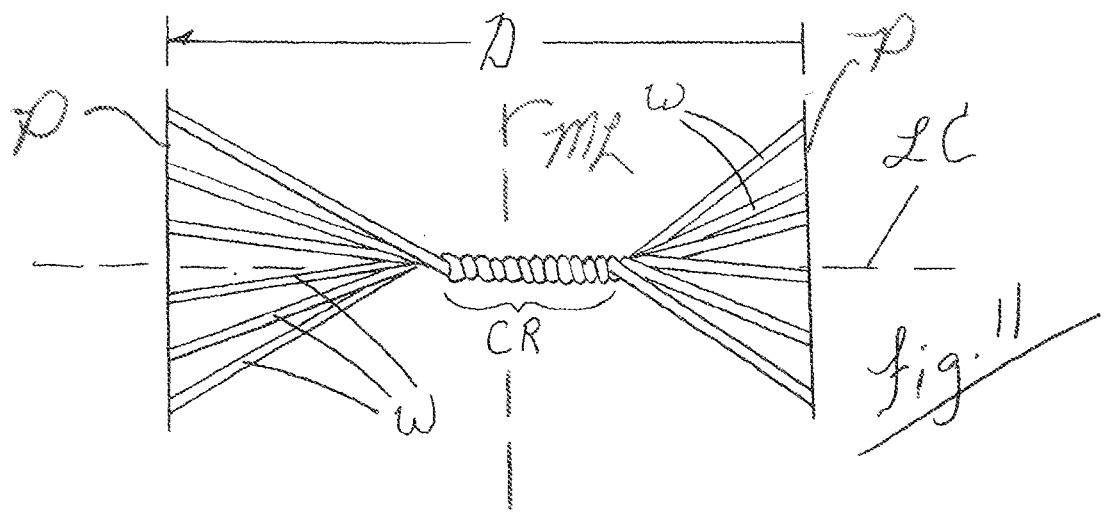
FIG. 11 is a schematic side view of the embodiment of FIGS. 9 and 10, wherein twisting/wrapping has continued to the extent that the wires are tightly wrapped around each other at the center of the wires/connector.

FIGS. 9, 10 and 11 schematically illustrate the progression of, and shapes produced by, tightening of the wires/lines W (such as elongated members 16, wires 36 or other lines, cables, ropes, straps, filaments, or strands, for example). Rotation begins in FIG. 9, for example by relative rotation of the housing-portion/plates P and the resulting twist/wrap of the wires/lines. The housing-portions/plates P may be described as the portions that control the wires/lines W and actuate wrapping. The schematically-portrayed housing-portions/plates P in FIGS. 9-11 are flat, planar, and parallel to each other, but it will be understood that alternative shapes of the two housing-portions also may be effective. Midway between the inner surfaces of the two housing-portions/plates P is midline ML, which is generally where the wrapped/twisted central region CR of wrapped wires/lines W (or "wrapped-line central region") will form; the midline ML also indicates the location of a mid-plane that is parallel to the plates P. Rotation and wrapping of the wires/lines W continue in FIG. 10 and start tightening at or very at the central region CR near the midline ML. By FIG. 11, the central regions CR of the wires/lines W are tightly twisted/wrapped. While the elongated elements-to-be-connected are not shown in FIGS. 9-11, it will be understood from this disclosure and the other drawings of this disclosure that the elongated elements-to-be-connected would each be at or near the longitudinal centerline LC of the connector, extend past the midline ML (and midplane), and be inside the twist/wrap at the illustrated central region CR of the wires/lines W.

While FIGS. 9-11 are not drawn to the same scale, it should be noted that the distance D between the locations where the wires/lines end are fixed to each housing-portion/plates P preferably remains the same throughout the process of FIGS. 9-11. In other words, the housing-portions/plates are connected together to remain as a single housing unit, but with the portions/plates rotatable relative to each other on the connector's central longitudinal axis, and the portions/plates preferably do not move or slide longitudinally any significant amount relative to each other during the twisting/wrapping of the wires/lines W. This way, the twisting/wrapping progressively creates and increases the substantial force on the elements within the twisted bundle of wires/lines W at their central region CR. Therefore, one may understand the great amount of tension on the wires/lines W and the great amount of radially inward-directed force/pressure at the central region CR of the wires/lines W.

FIGS. 1-8B illustrate certain embodiments that are adapted for insertion of elements-to-be-connected into opposite ends of the connector. The elements will extend into the interior space HS, toward and preferably past the middle of the connector, to touch or more preferably overlap, so that the elements are captured inside the central region of the wires/lines W, which is understood from FIG. 2 and labeled CR in the method of FIGS. 9-11.

FIGS. 12-15 illustrate another connector embodiment 40 that is adapted for insertion of multiple elements-to-be-connected into only one end of the connector, in this embodiment, into the outer end of housing portion 42 but not into the outer end of housing portion 44. The multiple elements (not shown in FIGS. 12-15), for example, multiple electrical conductors, may be inserted into the open-end OE of housing portion 42 and, as shown in FIG. 15, into the interior space HS of the connector 40 generally along the center of the circle/array of wires/lines. The opposite end of the connector, that is, housing portion 44, is closed, for example, with cap C. As discussed above for connector 20, the housing of connector 40 may being made as a unit with relatively rotating portions, or by separately-made portions snapping-together or otherwise being fastened together to allow relative rotation but to prevent any significant longitudinal-movement apart or together during use. Relative rotation of the two housing portions 42, 44 will twist/wrap the wires/lines 46 around the grouped, side-by-side ends of the conductors to connect all the conductor ends together in electrical connection.

Figure 12:
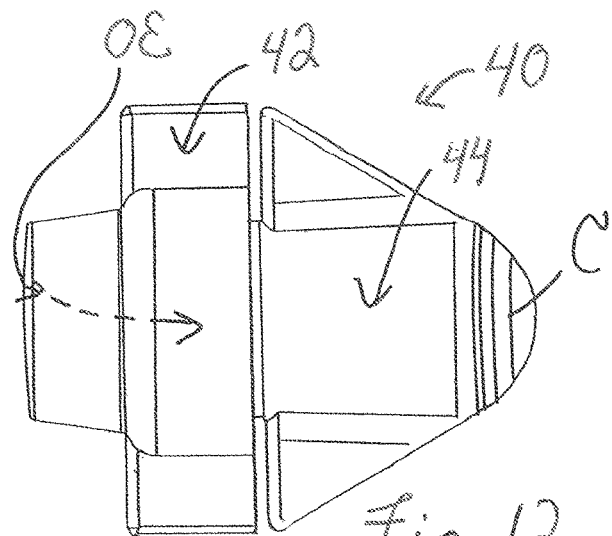
FIG. 12 is a right side view of an alternative embodiment of connector for insertion of multiple elements into a single end of the connector.
Figure 13:
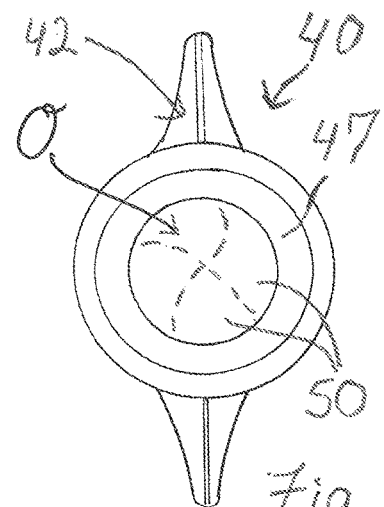
FIG. 13 is an end view of the connector of FIG. 12, specifically the open end at the left of FIG. 12.

FIG. 12 is a side view of the connector 40, FIG. 13 is an open-end view of the connector 40 wherein dashed perforation lines indicate that the endpiece 47 and/or the sealing ring 48 may comprise a perforated radial surface with flap portions 50 that flex for insertion of the elements into the connector 40, wherein the perforated radial surface and added sealant (not shown) provided in the endpiece 47 and/or the ring 48 may make the connector 40 water-resistant or water-proof during use. Hence, while the flap portions 50 and/or sealant may provide a water barrier, open end OE is still open for the purpose of element insertion into the connector 40. Certain other embodiments may be adapted to have the same or similar water-resistance/proofing at their open end(s).

Figure 14:
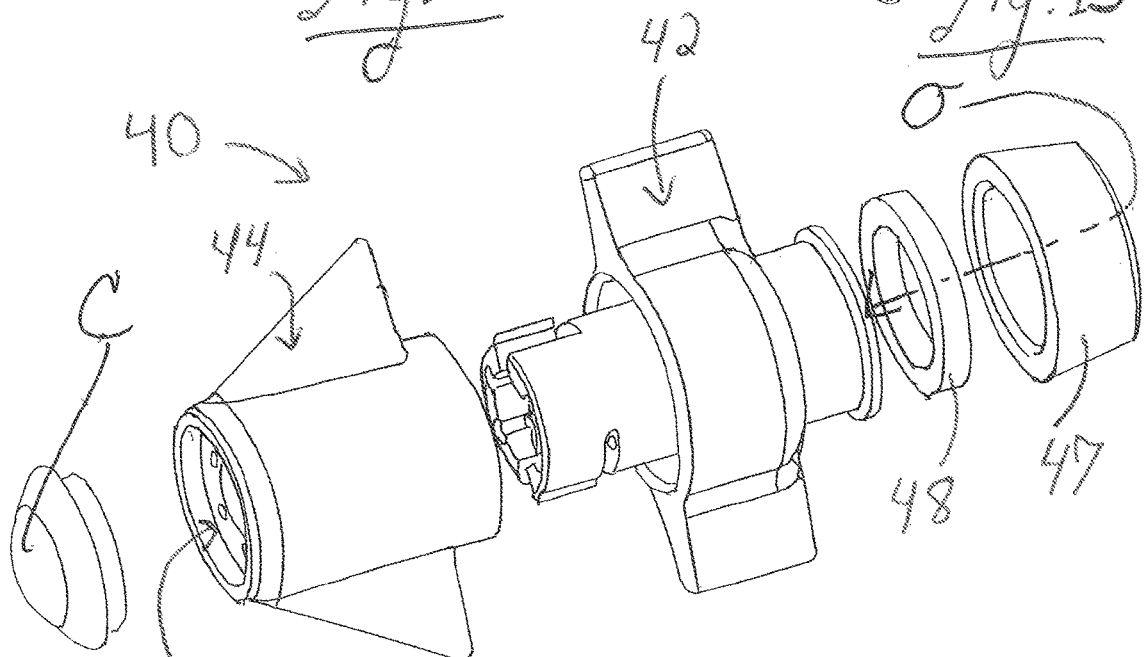
FIG. 14 is an exploded left side view of the connector of FIG. 12, wherein the open end is at the right end of this figure, and the closed end is at the left end of this figure.

FIG. 14 is an exploded view of the connector not showing wires/lines. FIG. 15 is a longitudinal cross-section of the connector of FIGS. 12-14, showing wires/lines 46 installed and with cap C removed to show to better advantage how the wires/lines 46 are installed in the connector.

Though not shown in FIGS. 12-15, it will be understood from this disclosure, that, when inserted into the connector 40, the grouped ends of conductors extend, along or near the longitudinal centerline LC that is inside the circle/cylinder of relaxed, straight wires/lines 46, past the midline between the plate inner surfaces P' (FIG. 15) of the two housing portions that twist/wrap the wires/lines 46. In certain embodiments, the grouped ends extend all or substantially all the way through the interior space HS of the connector. Then, the relative rotation of the two housing portions 42, 44 twists/wraps the wires/lines 46 around those conductor ends in the same manner as described above to secure them inside the connector and hold them in electrically conductive contact with each other.

Connector 40 includes a latch to hold the moveable housing portions in a desired connector-tightness, for example, a ratchet system such as described above for other embodiments. As stated previously in this document, the rotation may be done, for example, manually by grasping the two housing portions 42, 44 in different hands for relative rotation, and/or by using tools to grasp and rotate the portions 42, 44.

The Inventor(s)' U.S. Pat. No. 7,794,255, and other of the patents herein, may be instructive relating to embodiments of electrical connector housings that receive conductors into only one end. As suggested by FIG. 15, an alternative embodiment/use of connector 40 may comprise leaving the outer end OE' of housing portion 44 open, that is without a cap C or other closure, and then this connector 40 may be used the same or similarly as two-open-end connectors such as illustrated by FIGS. 1-8, 8A and B.

Coupler for Fluid Conduits:

Additional structure may be included inside the connector, for guiding or otherwise controlling the location of, or supporting, the elements-to-be connected. Such additional structure is especially preferred for fluid-conduit connectors, but may also be used in certain embodiments for additional support or capture/control of electrical-conductors inside the connector. In certain embodiments, this additional structure may be in the form of a hollow "insert" that is a tubular or generally tubular piece having opposite ends for insertion into the open ends of two fluid-conduits.

FIGS. 16-22A illustrate an embodiment 60 of the disclosed technology for connecting fluid conduits. FIGS. 16 and 17 are a side view, and an end perspective view, respectively, of the assembled connector 60. In FIGS. 16 and 17, the two housing portions 62, 64, or "collars", are shown with ends 67 of a rigid insert 68 extending slightly out from the housing portions 62, 64 and having a hollow interior passageway 69 through the entire insert 68. In use, two hoses, tubes, or other fluid-conduits 72, 74 are inserted through opposite ends of the connector 60 and the conduits' open ends are pushed over the exterior surfaces of opposing ends of an insert 68 (shown to best advantage in FIG. 18), to an extent (FIG. 19) that the two conduits end extremities are near each other, at or near the middle of the insert. The insert 68 is rigid, hollow and open-ended, forming an open-ended passageway for fluid-flow. When the housing portions 62, 64 are rotated relative to each other, the ends of each wire/line 66 (FIG. 22) remain secured to their respective housing portion, and the wires/lines 66 (for example, stainless steel, brass, nylon, or other) wrap around the conduit-covered insert ends so that the wires/lines 66 compress/force the conduit ends against the insert. The rotation may be done, for example, by manually grasping the two housing portions 62, 64 in different hands for relative rotation, and/or by using tools to grasp and rotate the portions 62, 64, for example. The conduits are thus secured on the insert and its protrusions extending from its exterior surface, and the conduits are typically somewhat compressible and will remain liquid-sealed to the insert 68 even in high-pressure liquid applications. As discussed above in this document, high pressure may be exerted, by the wires/lines 66 on the conduits over the insert, which secures and liquid-seals the conduits to the insert 68.

Figure 18:
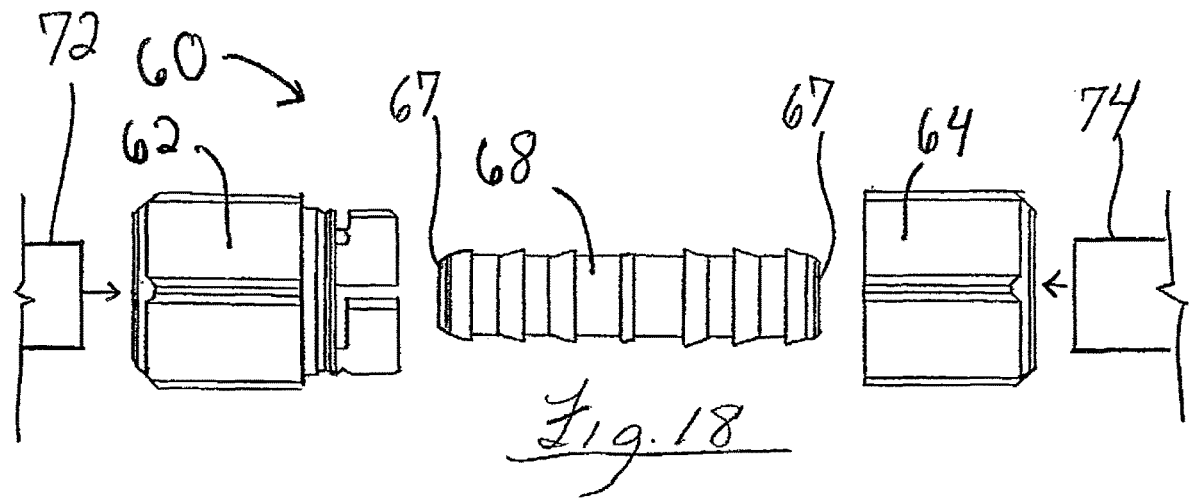
FIG. 18 is an exploded side view of the connector of FIG. 16, with two tubular fluid conduits being inserted into two housing portions of connector.
Figure 19:
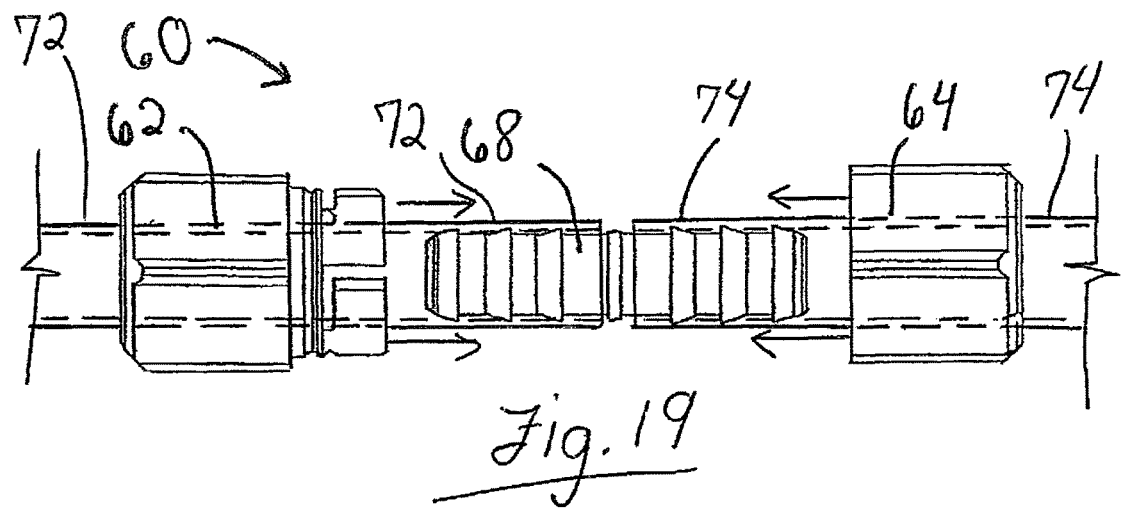
FIG. 19 is an exploded side view of the connector of FIG. 16, wherein each conduit has been pushed over a respective end of the hollow inert.

The exploded views of FIGS. 18 and 19 further illustrate the relationship of the fluid conduits 72, 74, housing portions 62, 64, and insert 68, the fluid conduits being installed into the connector 60 to be coaxial with the housing portions and coaxial with the hollow insert. In alternative embodiments, the connector is fully assembled, as in FIGS. 16 and 17, prior to pushing the conduits 72, 74 over the protruding ends of the insert (visible in FIGS. 16 and 17). In certain other embodiments, the two ends of the conduits 72, 74 may be pushed onto their respective ends of the insert 68, as in FIG. 19, prior to the steps of sliding the housing portions 62, 64 together over the conduit-end-insert combination and then connecting the housing portions 62, 64 together for use; for example, this may be done when the housing portions are adapted to snap-together features or to have latch or fastener features that a user may operate, wherein the features allows relative rotation but prevents any significant longitudinal-movement apart or together during use.

Also similarly as described above in this document, connector 60 has a latch/lock to prevent relative rotation in a direction that would loosen the wires/lines 66 relative to the conduits and hence that would loosen or unseal the conduits relative to the hollow insert. As shown in FIGS. 20 and 21, this latch/lock system for reverse rotation prevention may be a ratchet system provided on housing portions 62, 64.

FIGS. 22 and 22A show the installed wires/lines 66 and how the wires/lines 66 may be secured/fixed to the outer ends of the housing portion 62, 64.

As described above for other embodiments, the relaxed wires/lines of this fluid-conduit connector are parallel, but, when one housing end (collar) is rotated relative to the other in this embodiment, the wires/lines take a "hyperbolic" form. Upon further rotation of the housing portions, the hyperbolic form tightens around the conduits inserted into the connector and over the insert, to seal the conduits ends for leak-free fluid communication from one conduit, into the insert, and into the other conduit.

Provisional Patent Application Ser. No. 62/749,140, filed Oct. 23, 2018, and Non-Provisional patent application Ser. No. 16/660,764, filed Oct. 22, 2019, are incorporated herein by this reference. These prior applications by the Inventor(s)' are useful in that they illustrate certain housings and goals for connectors of fluid conduits, but these prior applications may be differentiated from the presently-disclosed technology in that the preferred wires/lines and connectors of the present technology are "non-pre-coiled", "non-pre-spiraled", and/or "non-pre-wrapped" wires/lines/connectors.

In the present technology, housing portions/plates and inserts may be made of various materials, for example, various polymers or composites that are durable, rigid, and water-resistant or waterproof.

In the present technology, each of the present technology's wire/line moves from its straight/linear or substantially straight/linear, relaxed condition inside the connector, due to twisting/wrapping that is done after insertion of the elements-to-be-connected into the connector. In many embodiments, the term "line" is a broad term that may be defined as a length of cord, rope, wire, or other material serving a particular purpose, the purpose herein being twisting/wrapping and being capable, when the line ends are rotated relative to each other, twisting/wrapping around elements-to-be-connected, and said twisting/wrapping causing tension on the line (for example, due to non-elasticity, non-stretchability) to render the resulting twist/wrap around the elements to be very tight. Various materials may be selected for lines based on the amount of electric conductivity (or non-conductivity), durability, and/or non-elasticity and non-stretchability that is desired; certain embodiments may be stainless steel, brass, nylon, or other materials, for example.

It may be noted that many of the lines and elements will have cylindrically-shaped outer surfaces, but that is not required in all embodiments. For example, in certain embodiments, cross-sections of the lines and/or elements may be other than circular, for example, square, rectangular, oblong or irregular, and the lines may have cross-sections different from those of the elements.

Although this invention has been described above with reference to particular means, materials, and embodiments, it is to be understood that the invention is not limited to these disclosed particulars, but extends instead to all equivalents within the broad scope of this disclosure and to all equivalents within the scope of the following claims.

The invention claimed is:

1. A connector for connecting multiple elements, the connector comprising:
   a first housing portion and a second housing portion around an interior space, and a longitudinal centerline extending through the interior space; and
   multiple elongated lines each having a first end secured to the first housing portion and a second end secured to the second housing portion, the lines in a relaxed condition being spaced from the longitudinal centerline and extending between the first and second housing portions through the interior space of the connector;
   wherein the first and second housing are rotatable relative to each other on the longitudinal centerline to move the lines into a tightened condition wrapped around each other in the interior space and to form a wrapped-line central region for capturing the multiple elements in said central region.

2. The connector of claim 1, wherein the first ends of the lines are secured to the first housing portion in a first circular arrangement distanced from the longitudinal centerline, and the second ends of the lines are secured to the second housing portion in a second circular arrangement distanced from the longitudinal centerline, and wherein the lines extend straight across the interior space parallel to the longitudinal centerline.

3. The connector of claim 1, wherein the lines are electrically conductive for connecting multiple elements that are electrically conductive.

4. The connector of claim 1, wherein the lines are non-electrically conductive for connecting multiple elements that are non-electrically conductive.

5. The connector of claim 1, wherein the first housing portion rotates in a first direction relative to the second housing portion, and the connector further comprises a latching system adapted to prevent the first housing portion from rotating relative to the second housing in a second direction that is opposite the first direction.

6. The connector of claim 5, wherein the latching system is a ratchet system.

7. A connector adapted to connect multiple elements in an interior space of the connector, the connector comprising:
   a housing with a first housing portion and a second housing portion and a longitudinal centerline extending through the interior space;
   multiple elongated lines each secured to the first housing portion and secured to the second housing portion, the lines in a relaxed condition extending between the first and second housing portions, spaced from the longitudinal centerline, through the interior space of the connector;
   the multiple elements being inserted into the connector through at least one open end of the connector and extending through at least a portion of the interior space at the longitudinal centerline;
   the first and second housing portions being rotatable relative to each other on the longitudinal centerline to move the lines into a tightened condition wrapped around the multiple elements and around each other at a central region of the lines to capture and connect the multiple elements.

8. The connector as in claim 7, wherein the elements and the lines are electrically conductive.

9. The connector as in claim 7, further comprising a rigid support insert in the interior space.

10. The connector as in claim 9, wherein the support insert is hollow and open-ended, the elements are two hollow fluid conduits each with a fluid passageway, and wherein each hollow fluid conduit extends over an open-end of the support insert to place the fluid passageways in fluid communication with each other through the insert.

11. The connector as in claim 10, wherein the two hollow fluid conduits are coaxial with the insert and with each other, and the two hollow fluid conduits do not longitudinally overlap each other on the support insert.

12. The connector as in claim 10, wherein opposing open-ends of the support insert protrude longitudinally out from the first housing portion and the second housing portion.

13. The connector as in claim 7, wherein a first element of the multiple elements extends into the connector through an open end in the first housing portion and a second element of the multiple elements extends into the connector through an open end in the second housing portion, and the first element and the second element extend along the longitudinal centerline and overlap at the central region of the lines in the tightened condition.

14. The connector as in claim 7, wherein each line has a midline, and all the multiple elements extend through one open end of the connector and through the interior space longitudinally past the midlines.

15. The connector as in claim 7, wherein first ends of the lines are secured to the first housing portion at securement positions that are spaced around, and distanced from, the longitudinal centerline, and second ends of the lines are secured to the second housing portion at securement positions that are spaced around, and distanced from, the longitudinal centerline and the lines in the relaxed condition extend substantially straight across the interior space.

16. A method of connecting elongated elements, the method comprising:
   providing a connector comprising:
      a housing having an interior space and a longitudinal centerline, and comprising a first housing portion and a second housing portion, the first and second housing being rotatable relative to each other on the longitudinal centerline;
      multiple elongated lines each secured to the first housing portion and to the second housing portion, the lines in a relaxed condition being spaced from the longitudinal centerline and extending between the first and second housing portions through the interior space of the connector;
      the first and second housing being rotatable relative to each other on the longitudinal centerline;
   the method further comprising:
   inserting the elongated elements into at least one end of the housing so that the elements extend through the interior space;
   rotating the first housing portion relative to the second housing portion to move the lines into a tightened condition wrapped around each other and around the elongated elements in the interior space to capture the multiple elements inside the connector.

17. The method of claim 16, wherein the elements and the lines are electrically conductive so that the connector electrically connects the elements.

18. The method of claim 16, wherein the connector further comprises a rigid support insert in the connector interior space.

19. The method of claim 18, wherein the support insert is hollow and open-ended, the elements are two hollow fluid conduits each with a fluid passageway, and wherein the method comprises pushing each hollow fluid conduit over an open-end of the support insert so that the fluid passageways are in fluid communication with each other through the insert.

20. The method of claim 19, wherein the two hollow fluid conduits are coaxial with the insert and with each other, and the two hollow fluid conduits do not longitudinally overlap each other on the support insert.

21. The method of claim 19, wherein opposing open-ends of the support insert protrude longitudinally out from the first housing portion and the second housing portion.

22. The method of claim 16, comprising inserting a first element of the elements into the connector through an open end in the first housing portion and inserting a second element of the multiple elements into the connector through an open end in the second housing portion, so that the first element and the second element extend along the longitudinal centerline and overlap at the central region of the lines in the tightened condition.

23. The method of claim 16, wherein each line has a midline, and all the elements are inserted through only one open end of the connector and through the interior space longitudinally past the midlines.

24. The connector as in claim 16, wherein first ends of the lines are secured to the first housing portion at securement positions that are spaced around, and distanced from, the longitudinal centerline, and second ends of the lines are secured to the second housing portion at securement positions that are spaced around, and distanced from, the longitudinal centerline, so that in a relaxed condition, the lines extend substantially straight across the interior space.

* * * * *